2,997,469
PREPARATION OF SUBSTITUTED TETRAHYDRO-OXAZINES

Werner Heel and Karl Zeile, Ingelheim, Germany, assignors to C. H. Boehringer Sohn, Ingelheim, Germany, a partnership
No Drawing. Filed Mar. 9, 1959, Ser. No. 797,885
Claims priority, application Germany Mar. 13, 1958
3 Claims. (Cl. 260—247)

This invention relates to a novel method of preparing substituted tetrahydro-oxazines from ethanolamino-ketones.

United States Patent No. 2,835,669 describes a method of preparing substituted tetrahydro-oxazines which comprises treating a corresponding substituted diethanolamine with concentrated sulfuric acid at substantially room temperature or with dilute acids at moderately elevated temperatures. This process, however, has not proved entirely satisfactory for various reasons.

United States Patent No. 2,566,097 discloses a method of preparing substituted tetrahydro-oxazines which comprises allowing a corresponding substituted diethanolamine to stand in solution for extended periods of time, whereby ring closure takes place. However, this method is operative only with a very limited number of diethanolamines and can therefore not be employed universally.

It is an object of the present invention to provide a process for the preparation of substituted tetrahydro-oxazines which employs a readily accessible starting material and relatively inexpensive reagents, produces very high yields and may be used to prepare a great variety of substituted tetrahydro-oxazines.

Other objects and advantages of the present invention will become apparent as the description proceeds.

It is known that ethanolamino-ketones having the structural formula

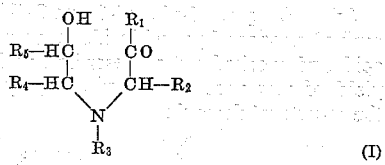

may also exist in their tautomeric form as cyclic hemi-acetals of the formula

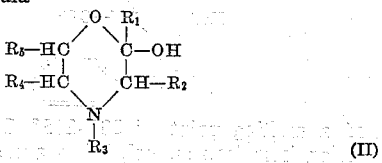

It has been unsuccessfully attempted to transform such cyclic hemi-acetals into tetrahydro-oxazines of the formula

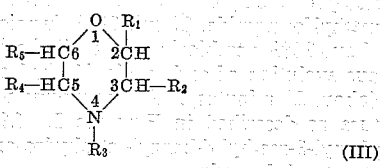

(See Lutz, J. Am. Chem. Soc., vol. 70, page 2020, and vol. 71, page 478.)

We have found that substituted tetrahydro-oxazines of the general structural formula

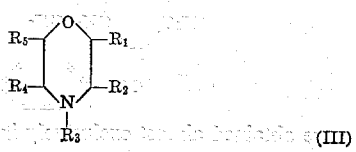

wherein $R_1$ represents an organic substituent which is unreactive toward formic acid, and $R_2$, $R_3$, $R_4$ and $R_5$ may be hydrogen or an organic substituent which is unreactive toward formic acid, are obtained by heating ethanolamino-ketones of the general structural formula

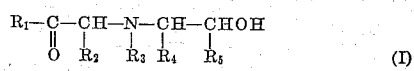

wherein $R_1$, $R_2$, $R_3$, $R_4$ and $R_5$ have the meanings defined above, or their salts, with formic acid and/or a substance which, upon being heated, decomposes to produce formic acid as a decomposition product.

While, as stated above, substituents $R_1$ through $R_5$ may represent any organic radical which is unreactive toward formic acid, it is particularly advantageous to employ as starting materials substituted ethanolamino-ketones of the Formula I above, wherein the organic substituents are alkyl radicals or cyclic hydrocarbon radicals which may in turn have one or more simple substituents, such as hydroxyl, alkyl, alkoxy radicals or a halogen, attached thereto.

The conversion of the amino-ketone (I) into the tetrahydro-oxazine (III) in accordance with the present invention proceeds in a surprisingly easy manner by simply heating the amino-ketone with formic acid alone or with formic acid in the presence of a suitable solvent medium. The use of 70–100% formic acid has proved to be particularly advantageous. In place of formic acid as such, substances which upon being heated decompose and produce formic acid as a decomposition product, such as formamide or dimethyl formamide, may also be used.

If the reaction according to the invention is carried out with formic acid alone, i.e. without a solvent medium, it may be advantageous to employ an excess of formic acid and/or of the substance which produces formic acid as a decomposition product. However, even when the reaction is carried out with the reactants being present in equimolar amounts, good results may be obtained. The formic acid may be used entirely or partially in the form of a salt, especially as the ammonium or amine salt.

Particularly suitable solvent media for use in the above reaction are amides, such as acetamide, dimethylformamide or dimethylacetamide; urea derivatives, such as N, N'-dimethylurea; as well as primary, secondary or tertiary amines, such as aniline, dimethylaniline or pyridine.

In general, the procedure comprises dissolving the amino-ketone (I), either in the form of the free base or as a salt, in formic acid and refluxing the resulting solution for 30–120 minutes at elevated temperatures, and preferably at the boiling point of the solution. A slow evolution of carbon dioxide may be observed during that time. Subsequently, the excess, unreacted formic acid is distilled off and the distillation residue, which is most often a syrupy mass, is heated for additional 30–120 minutes at about 160° C. internal temperature. As a rule, the evolution of carbon dioxide reaches its optimum at this temperature. As soon as the evolution of carbon dioxide ceases, the reaction has gone to completion.

By using amides or other suitable bases as the solvent medium, the required reaction temperature is decreased. Under these conditions the optimum carbon dioxide evolution takes place at internal temperatures of 130–140° C., and the reaction is sometimes considerably accelerated. At optimum conditions, which may vary from one case to another, the reaction goes to completion in about 10 minutes at temperatures of 130–140° C. If the solvent medium itself does not decompose into gaseous decomposition products upon being heated, as formamide does, the amount of carbon dioxide formed by the reaction may be used as a direct measure of the progress and completion of the reaction.

The addition of typical esterification catalysts to the reaction mixture, such as perchloric acid, trichloroacetic acid, p-toluene-sulfonic acid, strongly acid ion exchange resins, zinc chloride or boron trifluoride, may be of advantage.

If the reaction is carried out in formamide alone or in the presence of formic acid, the formation of a substituted imidazole can be observed in some instances. If strong organic bases, such as benzylamine, are used as a solvent medium, a Leuckart reaction (The Merck Index, 6th Ed., page 1067) may occur concurrently with the reaction which produces the desired tetrahydrooxazine. The occurrence of such side reactions depends substantially upon the starting materials used, and in most cases it is possible to suppress such side reactions entirely or to a substantial extent by suitable selection of the reaction conditions.

In the production of derivatives of tetrahydro-oxazine with more than one substituent attached to the carbon atoms of the heterocyclic nucleus, the formation of cis-transisomers is theoretically to be expected. In accordance with the process of the invention, either one of the two isomers is produced virtually exclusively, or a mixture of both isomers is obtained wherein the ratio of one isomer to the other may vary within wide limits, depending upon the reaction conditions. For example, upon reaction of an animo-ketone having the structural formula I, wherein $R_1$ is phenyl, $R_2$ is methyl and $R_3$ is benzyl, with formamide or anhydrous formic acid, almost exclusively the trans-isomer is obtained, whereas, if the amino-ketone is reacted with aqueous formic acid, the formation of the cis-isomer is favored.

The following examples will further illustrate the present invention and enable others skilled in the art to understand it more completely. However, it will be understood that the particular examples given below are merely illustrative of the broad concept of the present invention, and there is no intention on our part of limiting it to these particular examples.

EXAMPLE I

*2-phenyl-4-benzyl-tetrahydro-oxazine*

76.5 gm. 1-phenyl-1-oxo-2-(N-benzyl-ethanol-amino)-ethane-hydrochloride, 80 gm. benzylamine and 85 cc. of an 80% formic acid solution in water were intimately admixed in the cold, and the resulting mixture was refluxed for 2 hours on an oil bath at a bath temperature of 180° C. The reaction mixture was worked up by admixing it with about six volumes of water and adjusting the aqueous mixture to alkaline reaction with concentrated sodium hydroxide. An oily phase separated out which was extracted with ether. The ether extract was washed with water and dried over potassium carbonate. The solvent was distilled off and the distillation residue was fractionally distilled in vacuo. 2-phenyl-4-benzyl-tetrahydro-oxazine having the structural formula

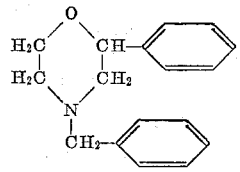

passed over at 0.03 mm. Hg and 115° C. The yield was virtually quantitative.

EXAMPLE II

*2-phenyl-3,4-dimethyl-tetrahydro-oxazine*

A mixture of 61 gm. 1-phenyl-1-oxo-2-(N-methyl-N-ethanol-amino)-propane-hydrochloride and 100 cc. 98–100% formic acid was refluxed at the boiling point at atmospheric pressure for 45 minutes on an oil bath. Thereafter, the oil bath temperature was increased to 180° C. and as much of the excess unreacted formic acid as possible was distilled off. A vigorous evolution of carbon dioxide developed during the distillation, which ceased after approximately 45 additional minutes. The honey-yellow syrup which remained as the distillation residue was worked up as described in Example I. The isolated reaction product of the formula

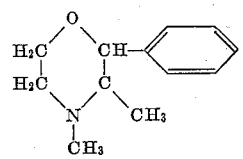

had a boiling point of 132–133° C. at 12 mm. Hg; the yield was 93% of theory.

EXAMPLE III

*2-methyl-3-phenyl-4-benzyl-tetrahydro-oxazine*

80 gm. 1-phenyl-1-(N-benzyl-N-ethanol-amino)-2-oxo-propane-hydrochloride were reacted with 120 cc. 98–100% formic acid, as described in Example II. Upon cooling, after seed crystal inoculation if required, the honey-yellow syrup solidified into a solid crystalline mass. This crystalline mass was triturated several times with ether and was vacuum filtered until dry. The almost white raw product, having the structural formula

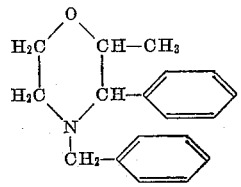

melted at 194–200° C. The yield of raw product was 98% of theory. The pure 2-methyl-3-phenyl-4-benzyl-tetrahydro-oxazine, having a melted point of 200–201° C., was obtained by recrystallization from isopropanol. The yield of purified product was 94% of theory.

*2-phenyl-3-methyl-4-benzyl-tetrahydro-oxazine*

(a) 80 gm. 1-phenyl-1-oxo-2-(N-benzyl-N-ethanolamino)-propane-hydrochloride were reacted with formic acid and worked up as described in Example III. The yield of raw product was virtually quantitative. It had the structural formula

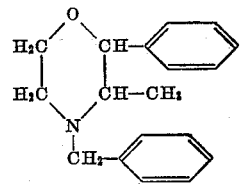

and a melting point of 208–215° C. Upon recrystallization from isopropanol, it had a melting point of 222–224° C. (trans-form).

(b) 80 gm. 1-phenyl-1-oxo-2-(N-benzyl-N-ethanolamino)-propane-hydrochloride were refluxed with 75 ml. dimethylformamide, 20 ml. 98% formic acid and 5 ml. of about 70% perchloric acid until the initially very vigorous evolution of carbon dioxide had completely subsided (about 20 minutes). After working up the reaction mixture as described in Example I, 92% of theory of 2-phenyl-3-methyl-4-benzyl-tetrahydro-oxazine, having the structural formula

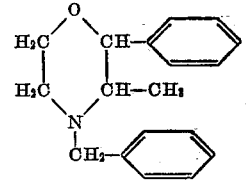

were obtained almost exclusively in the trans-form. The boiling point of the product was 150–155° C. at 0.1 mm. Hg.

(c) The influence of the water content of the reaction solution upon the composition of the steroisomeric mixture is shown by the following example:

A mixture of 142 gm. 1-phenyl-1-oxo-2-(N-benzyl-N-ethanol-amino)-propane and 100 ml. formic acid was refluxed at the boiling point at atmospheric pressure until the evolution of carbon dioxide had ceased. After working up the reaction mixture in the manner described under (a) and (b) above, the following yields were obtained:

80% formic acid: Yield 70.6% of theory 2-phenyl-3-methyl-4-benzyl-tetrahydro-oxazine (primarily cis-form); boiling point 130–132° C. at 0.4 mm. Hg.

98–100% formic acid: Yield 68.2% of theory 2-phenyl-3-methyl-4-benzyl-tetrahydro-oxazine (primarily trans-form); boiling point 136–138° C. at 0.4 mm. Hg.

The ratio of stereoisomers in the end product was determined by hydrogenation of the benzyl radical and fractional crystallization of the known hydrochlorides of the stereoisomeric 2-phenyl-3-methyl-tetrahydro-oxazines.

EXAMPLE V 2-(p-chlorophenyl)-4-benzyl-tetrahydro-oxazine

A mixture of 154 gm. 1-(p-chlorophenyl)-1-oxo-2-(N-benzyl-N-ethanol-amino)-ethane-hydrochloride, 15 gm. anhydrous zinc chloride and 150 ml. formamide was refluxed for 45 minutes—after liquefying the crystal slurry, advantageously accompanied by stirring. The reaction mixture was then worked up as described in Example I. The reaction product had the structural formula

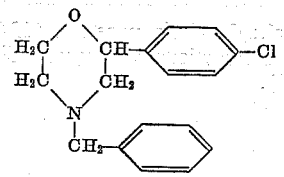

and a boiling point of 140–145° C. at 0.2 mm. Hg; the yield was 80–83% of theory; the melting point of its hydrochloride (recrystallized from water) was 215–217° C.

EXAMPLE VI 2-phenyl-3-benzyl-4-methyl-tetrahydro-oxazine

A mixture of 65 gm. 1,3-diphenyl-1-oxo-(N-methyl-N-ethanol-amino)-propane-hydrochloride, 75 cc. formamide and 5 cc. perchloric acid was refluxed for 45 minutes on an oil bath at a bath temperature of 160–170° C. The reaction mixture was then worked up as described in Example I. The raw product had the structural formula

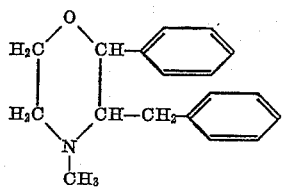

and a boiling point of 110–120° C. at 0.01 mm. Hg; the yield was 81% of theory; the melting point of its hydrochloride, when recrystallized from isopropanol, was 134–135° C. (decomposition).

EXAMPLE VII 2-(5,6,7,8-tetrahydronaphthyl-2)-3,4-dimethyl-tetrahydro-oxazine

A mixture of 89 gm. 1-(5,6,7,8-tetrahydronaphthyl-2)-1-oxo-2-(N-methyl-N-ethanol-amino)-propane-hydrochloride, 100 cc. formamide and 3 gm. Levatit KS, a sulfonated phenol ion exchange resin with a medium degree of cross-linking, was refluxed and worked up analogous to Example VI. The reaction product had the structural formula

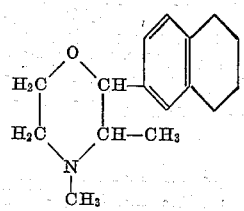

and a boiling point of 130–135° C. at 0.1 mm. Hg; the yield was 79% of theory. The melting point of its hydrochloride, when recrystallized from isopropanol, was 204–205° C.

EXAMPLE VIII 2-(m-hydroxyphenyl)-3-methyl-tetrahydro-oxazine 40.7 gm. (0.1 mol) 1-(m-benzyloxy-phenyl)-1-keto-2-(N-benzyl-N-ethanol-amino)-propane-hydrochloride were admixed with 25 cc. formic acid, and the mixture was heated at a temperature of 150–180° C. until 1 mol carbon dioxide had evolved. The residue was made alkaline with sodium hydroxide, extracted with ether, and the ether was evaporated. The evaporation residue, consisting essentially of 1-benzyl-2-(m-benzyloxy-phenyl)-3-methyl-tetrahydro-oxazine, was hydrogenated in methanolic solution with nickel as a catalyst. After 2 mols of hydrogen had been absorbed, the reaction mixture was separated from the catalyst by filtration; the methanol was distilled from the filtrate, and the distillation residue was admixed with a solution of hydrochloric acid in ether, whereby a mixture of the cis- and trans-isomers of the compound

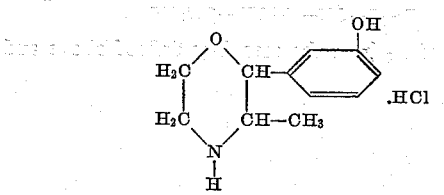

crystallized out. The yield was 85%; the pure trans-hydrochloride had a melting point of 215–216° C.

EXAMPLE IX 2-(p-methoxyphenyl)-3-methyl-tetrahydro-oxazine 30.5 gm. (0.1 mol) 1-(p-methoxyphenyl)-1-keto-2-(N-benzyl-N-ethanol-amino)-propane were admixed with 25 cc. formic acid and the mixture was heated at 115–120° C. until 1 mol carbon dioxide had evolved. The reaction mixture was then worked up as described in Example VIII. The yield of 2-(p-methoxyphenyl)-3-methyl-morpholine, having the structural formula

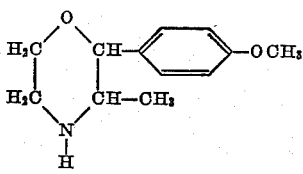

was 80% of theory. The pure trans-form had a melting point of 98–100° C. and its hydrochloride had a melting point of 207° C.

The above procedure was repeated, except that the hydrochloride of 1-(p-methoxyphenyl)-1-keto-2-(N-benzyl-N-ethanol-amino)-propane was used as the starting material and the reaction mixture was heated to about 150° C. The results were the same.

While we have illustrated certain specific embodiments of the present invention, those skilled in the art will readily recognize that our invention is not limited to these illustrative embodiments, and that various changes and modifications may be made without departing from the spirit of the invention or the scope of the appended claims.

The substituted tetrahydro-oxazines disclosed herein are pharmacologically useful as stimulants of the central nervous system, as evidenced by an increase in the motility of cats and dogs upon parenteral administration of the compounds to such animals. Furthermore these compounds exhibit favorable effects on the heart and circulation. In addition they are useful as additives to oils and lubricants.

We claim:

1. The process of preparing compounds selected from the group consisting of substituted tetra-hydro-oxazines having the structural formula

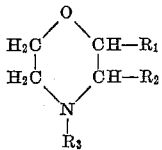

wherein $R_1$ is selected from the group consisting of lower alkyl, phenyl, chloro-phenyl, hydroxy-phenyl, lower alkoxy-phenyl and tetrahydro naphthyl, $R_2$ is selected from the group consisting of hydrogen, lower alkyl, phenyl and benzyl, and $R_3$ is selected from the group consisting of hydrogen, lower alkyl and benzyl, and acid addition salts thereof, which comprises heating a compound selected from the group consisting of ethanolamino-ketones having the structural formula

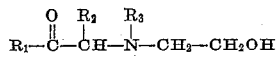

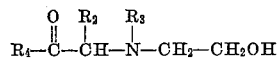

wherein $R_2$ and $R_3$ have the meanings defined above and $R_4$ is selected from the group consisting of lower alkyl, phenyl, chloro-phenyl, lower alkoxy-phenyl, benzyloxy-phenyl and tetrahydro-naphthyl, and acid addition salts thereof in the presence of formic acid to a temperature between about 130° C. and the boiling point of the reaction mixture, and, when $R_4$ is benzyloxy-phenyl, subjecting the reaction product to catalytic hydrogenation to remove the benzyl group.

2. The process of producing compounds selected from the group consisting of substituted tetrahydro-oxazines and acid addition salts thereof as in claim 1, wherein the reaction components are heated in a solvent medium selected from the group consisting of acetamide, dimethyl-acetamide, N,N'-dimethyl-urea, aniline, dimethylaniline, pyridine and benzylamine.

3. The process of producing compounds selected from the group consisting of substituted tetrahydro-oxazines and acid addition salts thereof, as in claim 1, wherein the ethanolamino-ketone compound is heated in the presence of formic acid and of an esterification catalyst selected from the group consisting of perchloric acid, trichloro-acetic acid, p-toluene-sulfonic acid, sulfonated phenol ion exchange resins, zinc chloride and boron trifluoride.

References Cited in the file of this patent

UNITED STATES PATENTS

| | | |
|---|---|---|
| 615,488 | Knorr | Dec. 6, 1898 |
| 1,859,527 | Payman et al. | May 24, 1932 |
| 1,867,982 | Naunton et al. | July 19, 1932 |
| 2,777,846 | Laemmle | Jan. 15, 1957 |
| 2,835,669 | Thoma | May 20, 1958 |

OTHER REFERENCES

Berkman et al.: Catalysis, page 190 (1940).

Surrey: Name Reactions in Organic Chemistry, page 110–112 (1954).

UNITED STATES PATENT OFFICE
CERTIFICATE OF CORRECTION

Patent No. 2,997,469                          August 22, 1961

Werner Heel et al.

It is hereby certified that error appears in the above numbered patent requiring correction and that the said Letters Patent should read as corrected below.

Column 3, line 27, for "animo-" read -- amino- --; line 43, for "(N-benzyl-ethanol-amino)" read -- (N-benzyl-N-ethanol-amino) --; column 4, line 37, for "melted" read -- melting --; same column 4, between lines 39 and 40, insert as a centered heading -- EXAMPLE IV --; column 7, lines 31 to 33, strike out the first part of the structural formula reading:

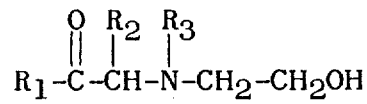

Signed and sealed this 6th day of February 1962.

(SEAL)
Attest:

ERNEST W. SWIDER                          DAVID L. LADD
Attesting Officer                       Commissioner of Patents